2,998,364
IMPROVEMENTS RELATING TO MODERATOR STRUCTURES FOR NUCLEAR REACTORS
John Jeffrey Stubbs and Terence Ingham, both of Whetstone, near Leicester, England, assignors to The English Electric Company Limited, London, England, a British company
Filed May 27, 1957, Ser. No. 661,893
4 Claims. (Cl. 204—154.2)

This invention relates to nuclear reactors of the kind including a moderator built up from transversely spaced columns of graphite blocks, the blocks being substantially square in cross section and having the minimum rate of growth in their lengthwise direction, and the fuel element channels being arranged to extend lengthwise through the blocks.

According to the present invention, in such a reactor the fuel element channels are offset diagonally in each block from the longitudinal centre line thereof by a similar amount, the columns of blocks being assembled with the fuel element channels disposed on a square lattice and with the sides of the blocks parallel to the corresponding axes of the lattice but with adjacent blocks along each axis of the lattice displaced to opposite sides thereof.

According to a further feature of the invention, axially adjacent blocks in each column are displaced in different directions from the axis of the fuel channel.

According to a still further feature of the invention, the columns are spaced transversely from each other by two sets of graphite spacers, one set of spacers being arranged to extend through the blocks in a direction parallel to one of the transverse axes of the blocks and the other set of spacers being arranged to extend through the blocks in a direction parallel to the other transverse axis, each set of spacers being provided with locating means for transversely locating the columns relative to each other and each set being arranged to have minimum rate of growth along its axis.

Figure 1:
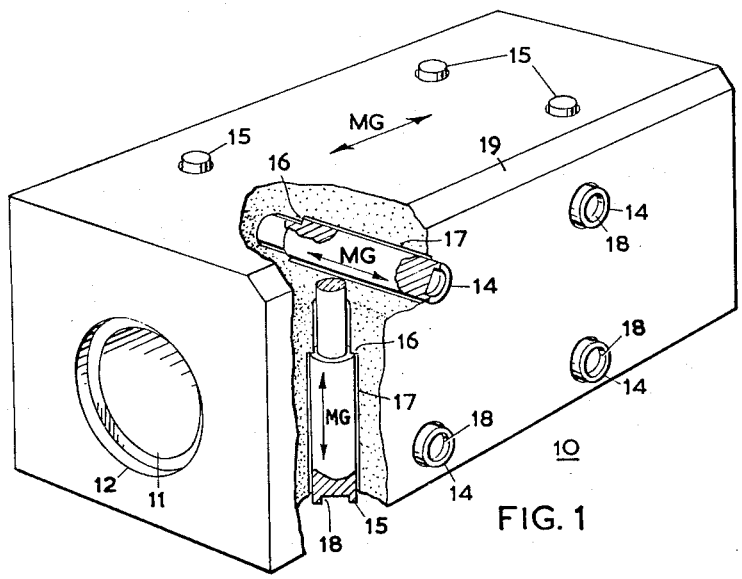
Figure 3:
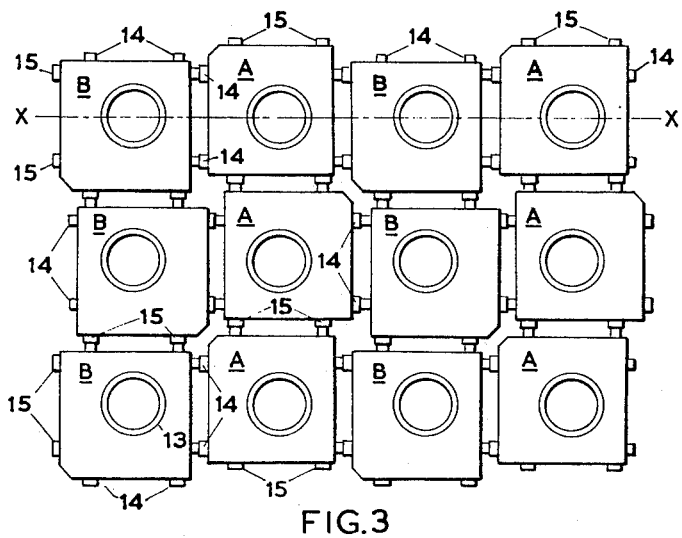
Figure 4:
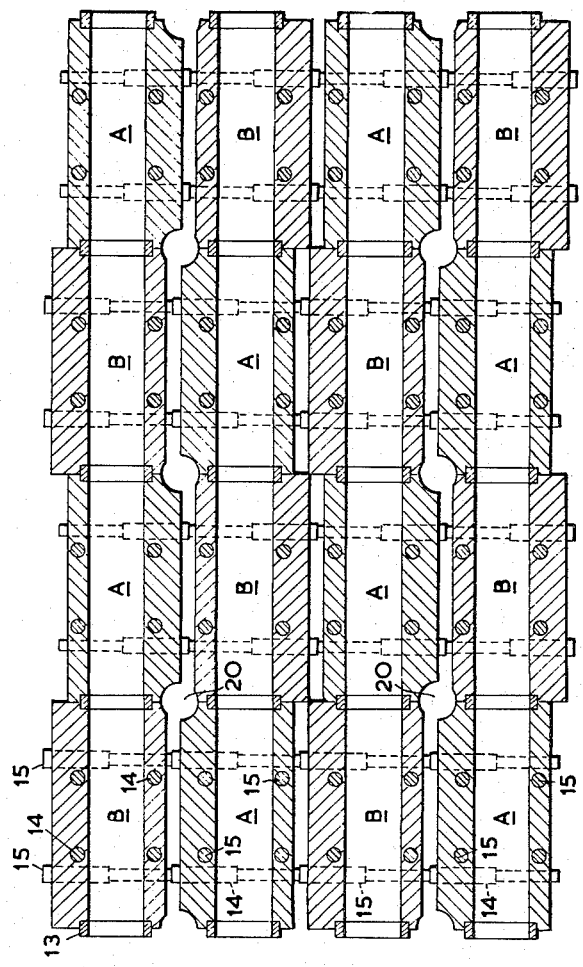
Figure 2:
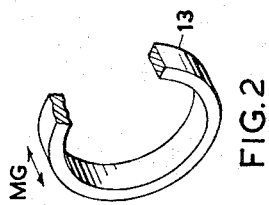

Further preferred features of the invention will appear from the following description with reference to the accompanying drawings. FIG. 1 is an isometric view of one form of block embodying the invention, partly cut away to show details of the locating pegs. FIG. 2 is a view showing one of the connecting tubes for connecting the axially aligned coolant channels together, FIG. 3 is an end elevation of part of an assembled moderator (having horizontally disposed fuel channels) using the blocks according to FIG. 1, whilst FIG. 4 is a sectional plan taken on the line X—X of FIG. 3.

Referring now to FIG. 1, a square section graphite block, generally indicated at 10, has a longitudinally extending fuel channel 11 formed therein which is recessed at each end, as shown at 12, to receive the short graphite connecting tube 13 shown in FIG. 2, the internal diameter of this tube being the same as the diameter of the fuel channel. Both the block 10 and the connecting tube 13 are extruded in a direction parallel to the longitudinal axis and the direction of minimum growth is therefore in each case as indicated by the arrows M, G.

Fitted to the block are eight identical graphite locating pegs extruded in a direction parallel to the axis of the pegs and again the direction of minimum growth is therefore as shown by the arrows M, G. Four of these pegs, reference 14, extend horizontally through the block in planes normal to the axis thereof, whilst the other four pegs, reference 15, extend vertically through the block also in planes normal to the longitudinal axis thereof.

Each peg has a shoulder 16 midway between its ends and each peg passes through a counterbored clearance hole 17 in the block of a diameter such as to allow for the differential growth of the peg and the block in a plane normal to the axis of the peg. As will be seen from the drawings, the pegs project a short distance at each end beyond the corresponding face of the block, a recess 18 being formed in the large diameter end of each peg.

The fuel channel 11 is displaced to the left and downwards (as viewed in the drawings) relative to the longitudinal axis of the block, in each case by an amount equal to half the desired clearance between the blocks. The pegs themselves are disposed symmetrically about the respective transverse centre lines of the fuel channels and a small chamfer 19 of size approximately equal to the desired clearance between blocks is formed on that corner of the block remote from the fuel channel.

In the assembly shown in FIGS. 3 and 4, two basic types of blocks, hereinafter referred to as types A and B respectively, are used to form the assembled moderator. Type A block is exactly as shown in FIG. 1, whilst type B block is similar to that shown in FIG. 1 but with the fuel channel and the pegs displaced to the left and upwards (as viewed in FIG. 1) relative to the longitudinal axis of the block and by the same amount. In both blocks the chamfer is along that corner farthest from the fuel channel.

As shown most clearly in FIG. 3, the blocks are assembled with the fuel element channels on a square lattice but in each layer of blocks the adjacent blocks along each axis of the lattice are displaced to opposite sides thereof, the displacement being achieved by selecting the appropriate type of block and orienting it to the correct position.

It will also be seen from FIG. 4 that in each column axially adjacent blocks are displaced to opposite sides of the fuel channel axis, this being achieved by selecting blocks of alternatively type A and type B. In alternate layers the type A block is turned through 180° about a vertical axis and the type B block is turned about its longitudinal axis through 90° anti-clockwise (as viewed in FIG. 3). In each case the small diameter ends of the locating pegs mate with the recesses 18 in the large diameter ends of adjacent locating pegs.

The connecting tubes 13 are inserted in the recesses 12 in the ends of the blocks during assembly so as to form a continuation of the fuel element channels between the blocks.

From the foregoing it will be apparent that, whilst the fuel element channels are positioned on a square lattice, by displacing the individual blocks as described, no direct line of sight between the blocks is formed on any of the three major axes of the moderator structure. Neutron streaming is therefore reduced as compared with an arrangement in which there is no displacement of the blocks.

Vertical control rod channels 20 are formed by milling out quadrants in the appropriate corners of certain of the blocks before assembly. Alternatively, semi-circular recesses may be milled in the sides of appropriate blocks. In the assembled moderator the control rod channels will be distributed over the top face thereof on a regular lattice spacing.

The arrangement according to the invention may, of course, also be used for reactors in which the fuel channels are vertical.

What we claim as our invention and desire to secure by Letters Patent is:

1. A moderator structure for a nuclear reactor comprising, in combination, a plurality of square cross-section, elongated graphite blocks, each block having a fuel channel hole formed therein and extending longitudinally therethrough which is displaced diagonally from the longitudinal center line of said block towards one corner thereof, each said fuel channel hole in each said block having an enlarged portion adjacent each end, connecting tube means having the internal diameter thereof equal to the diameter of said fuel channel hole, said connecting tube means positioned in one said enlarged portion and extending beyond the end of said block, a plurality of said blocks arranged end-to-end to form a column, said blocks of each column being assembled with said holes in axial alignment whereby to form a fuel channel extending in a longitudinal axial direction through said column, and spacer means for spacing said columns transversely from each other with said fuel channels disposed at the intersections of a square lattice and with the sides of said blocks extending parallel to the axes of the lattice, said moderator structure being assembled with the longitudinal center lines of said columns of blocks displaced alternately along each lattice axis to opposite sides of said axis and in the same direction relative to the transverse lattice axes, whereby the clearance spaces between said columns present tortuous paths extending transversely through said structure in directions generally parallel to the axes of the lattice.

2. A moderator structure for a nuclear reactor comprising, in combination, a plurality of columns comprising a plurality of square cross-section, elongated graphite blocks, each block having a fuel channel hole formed therein and extending longitudinally therethrough which is displaced diagonally from the longitudinal center line of said block towards one corner thereof and each block being chamfered throughout its length on the corner remote from said hole, each said fuel channel hole in each said block having an enlarged portion adjacent each end, connecting tube means having the internal diameter thereof equal to the diameter of said fuel channel hole, said connecting tube means positioned in one said enlarged portion and extending beyond the end of said block, said blocks of each column being assembled with said holes in axial alignment to form a fuel channel extending in a longitudinal axial direction through said column, and spacer means for spacing said columns apart from each other with said fuel channels disposed at the intersections of a square lattice and with the sides of said blocks extending parallel to the axes of the lattice, said structure being assembled with the longitudinal center lines of said columns of blocks displaced alternately along each lattice axis to opposite sides of the axis and in the same direction relative to the transverse lattice axes, the amount of displacement of said holes in said blocks being such that, when said structure is assembled, no direct transverse line of sight exists between said columns in directions parallel to the axes of the lattice.

3. A moderator structure for a nuclear reactor comprising, in combination, a plurality of columns comprising a plurality of square cross-section, elongated graphite blocks, each block having a fuel channel hole extending longitudinally therethrough which is displaced diagonally from the longitudinal center line of said block towards one corner thereof and each block being chamfered throughout its length on the corner remote from said fuel channel hole, each said fuel channel hole in each said block having an enlarged portion adjacent each end, connecting tube means having the internal diameter thereof equal to the diameter of said fuel channel hole, said connecting tube means positioned in one said enlarged portion and extending beyond the end of said block, said blocks of each column being assembled with the holes in axial alignment to form a fuel channel extending axially through said column, and spacer means for spacing said columns apart from each other with said fuel channels disposed at the intersections of a square lattice and with the sides of said blocks extending parallel to the axes of the lattice, individual blocks of each column being assembled with the longitudinal center lines thereof displaced diagonally in opposite directions relative to said fuel channel alternately along the length of said column, and said structure being assembled with said columns oriented relative to each other so that the longitudinal center lines of each layer of blocks are displaced alternately along said lattice axis to opposite sides of the axis and in the same direction relative to the transverse lattice axes, the amount of displacement of said holes in said blocks being such that, when said structure is assembled, no direct line of sight exists in any direction between said columns.

4. A moderator structure for a nuclear reactor comprising, in combination, a plurality of square cross-section, elongated graphite blocks having a minimum rate of growth along the longitudinal axis thereof, each block having a fuel channel hole extending longitudinally therethrough which is displaced diagonally from the longitudinal center line of said block towards one corner thereof, each said fuel channel hole in each said block having an enlarged portion adjacent each end, connecting tube means having the internal diameter thereof equal to the diameter of said fuel channel hole, said connecting tube means positioned in one said enlarged portion and extending beyond the end of said block, a plurality of said blocks arranged end-to-end to form a column, said blocks of each column being assembled with said holes in axial alignment to form a fuel channel extending axially through said column, and two sets of graphite spacing pegs having a minimum rate of growth along the longitudinal axis thereof extending transversely through each block at right angles to each other and parallel with the sides of said block, each set of pegs being shaped at the outer ends thereof to mate with the pegs of transversely adjacent blocks so as to space said columns transversely from each other with said fuel channels disposed at the intersections of a square lattice and with the sides of said blocks extending parallel to the axes of the lattice, said moderator structure being assembled with the longitudinal center lines of the columns of blocks displaced alternately along each lattice axis to opposite sides of the axis and in the same direction relative to the transverse lattice axes, whereby the clearance spaces between said columns present tortuous paths extending transversely through said structure in directions generally parallel to the axes of the lattice.

References Cited in the file of this patent

UNITED STATES PATENTS

| Number | Name | Date |
|---|---|---|
| 800,719 | Canter | Oct. 3, 1905 |
| 2,341,757 | Brenneman et al. | Feb. 15, 1944 |
| 2,482,402 | Corcodilas | Sept. 20, 1949 |
| 2,493,435 | Archambault | Jan. 3, 1950 |
| 2,583,912 | Weiss | Jan. 29, 1952 |
| 2,671,817 | Groddeck | Mar. 9, 1954 |
| 2,838,451 | Long et al. | June 10, 1958 |
| 2,852,457 | Long et al. | Sept. 16, 1958 |
| 2,865,828 | Long et al. | Dec. 23, 1958 |

OTHER REFERENCES

Allardice et al.: TID–292, pp. 10–11, Dec. 13, 1946.